(12) United States Patent
Das et al.

(10) Patent No.: US 6,742,036 B1
(45) Date of Patent: May 25, 2004

(54) METHOD FOR SUPPORTING MOBILITY ON THE INTERNET

(75) Inventors: Chandan Das, Gauting (DE); Ulrich Gremmelmaier, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/581,714

(22) PCT Filed: Dec. 7, 1998

(86) PCT No.: PCT/EP98/07944

§ 371 (c)(1),
(2), (4) Date: Jun. 16, 2000

(87) PCT Pub. No.: WO99/33239

PCT Pub. Date: Jul. 1, 1999

(30) Foreign Application Priority Data

Dec. 19, 1997 (DE) .......................................... 97 122 541

(51) Int. Cl.[7] ............................................. G06F 15/173
(52) U.S. Cl. ...................................... 709/226; 370/328
(58) Field of Search ............................... 709/227, 245, 709/220, 226, 229; 370/352, 328

(56) References Cited

U.S. PATENT DOCUMENTS

| 5,901,352 | A | * | 5/1999 | St-Pierre et al. .......... 455/426.1 |
| 5,946,629 | A | * | 8/1999 | Sawyer et al. ............... 455/466 |
| 5,953,322 | A | * | 9/1999 | Kimball ....................... 370/328 |
| 5,974,453 | A | * | 10/1999 | Andersen et al. ............ 709/220 |
| 5,978,650 | A | * | 11/1999 | Fischer et al. ................. 725/73 |
| 6,013,107 | A | * | 1/2000 | Blackshear et al. .......... 709/229 |
| 6,137,791 | A | * | 10/2000 | Frid et al. .................... 370/352 |
| 6,167,513 | A | * | 12/2000 | Inoue et al. .................. 713/150 |
| 6,356,622 | B1 | * | 3/2002 | Hassell et al. .............. 379/1.01 |
| 6,411,632 | B2 | * | 6/2002 | Lindgren et al. ............ 370/466 |
| 6,466,964 | B1 | * | 10/2002 | Leung et al. ................ 709/202 |
| 6,487,406 | B1 | * | 11/2002 | Chang et al. ................ 455/426 |
| 6,490,259 | B1 | * | 12/2002 | Agrawal et al. ............. 370/331 |
| 2001/0021175 | A1 | * | 9/2001 | Haverinen ................... 370/230 |
| 2002/0026527 | A1 | * | 2/2002 | Das et al. ..................... 709/245 |
| 2002/0112076 | A1 | * | 8/2002 | Rueda et al. ................. 709/245 |

FOREIGN PATENT DOCUMENTS

WO    WO 97/04611    6/1997

OTHER PUBLICATIONS

Teraoka et al., "Mobility Support in IPv6 Based on the VIP Mechanism", Apr. 1995, http://inet.nttam.com, 13 pages.*
Transparent Mobile IP: an Approach and Implementation—XP–002068554—Giovanardi et al—1997 IEEE—p. 1861–1865.

* cited by examiner

Primary Examiner—Bunjob Jaroenchonwanit
(74) Attorney, Agent, or Firm—McCormick, Paulding & Huber LLP

(57) ABSTRACT

The present invention supports total personal mobility in the Internet. For a subscriber, service readiness of a terminal that is not connected to the subscriber's home network is provided in that, with the aid of the identification of the subscriber which is inputted via the terminal, an IP address for the subscriber is interrogated at a server agent in the home network of the subscriber, and the interrogated IP address is transferred to a proxy node component of the terminal.

10 Claims, 1 Drawing Sheet

METHOD FOR SUPPORTING MOBILITY ON THE INTERNET

BACKGROUND OF THE INVENTION

The present invention relates to a method for supporting mobility in the internet.

In networks today, the supporting of mobility is only possible in dedicated areas of a network and is thus very limited. To support unlimited subscriber mobility (personal mobility), enhanced network mechanisms are required. This assumes a subscriber who is registered as a subscriber with one or more Internet Service Providers (ISPs), or, corporate networks. Mobility refers to the movement of the subscriber across network boundaries; that is, even into networks of random other ISPs or companies.

The present invention provides a method for supporting personal mobility which makes possible the availability of services at terminals which are connected in principle to arbitrary access nodes for the Internet. To characterize personal mobility, the subscriber has an identifier (identification), which can be represented by logical addresses, for example, similar to those used in an e-mail format. Basically, it should be possible to use universal (that is, not specially configured) terminals, such as standard PCs in hotel rooms, conference rooms or Internet cafes, or portable notebooks.

In the Internet, and within the Internet Engineering Task Force (IETF), two methods are known which enable limited mobility:

a) roaming capabilities (roaming operations working group within IETF): roaming agreements between ISPs enable Internet access to the local dial-in nodes of the contracting ISPs;

b) terminal mobility (mobile IP working group within IETF): enables mobility between local networks (LANs) which are connected via the Internet, with a terminal having a strictly assigned address moving from one location to another (see C. Perkins, "Mobile IP", IEE Communications Magazine, May 1997, pp.84–99).

However, the above methods described in a) and b) support only limited mobility:

a): This method only offers support with respect to authentication and billing. It opens access to foreign ISPs, but only with the services provided there. In this case, the subscriber is assigned a temporary address, which is not directly known either in the home network or anywhere else in the Internet; that is, it is not possible to receive messages or to use services without first having given one's temporary address to the respective communication partner.

b): In this method, the foreign network must be a LAN. The terminal used must be configured specifically for mobile IP. The terminal is permanently connected to a specific address from the home network. For several home networks, a separate configuration is respectively required. Therefore, there is no flexibility here with respect to a free selection of terminal equipment.

SUMMARY OF THE INVENTION

It is the object of the invention to guarantee the complete supporting of mobility.

This object is inventively achieved in accordance with the present invention in a method for supporting mobility in the Internet, the method comprising the steps of: providing a terminal that is not connected to a home network of a subscriber; inputting a subscriber identification for the subscriber via the terminal; and providing service readiness of the terminal for the subscriber by interrogating an IP address for the subscriber at a server agent in the home network of the subscriber by an Internet access component with the aid of the subscriber identification.

In an embodiment, the interrogated IP address is transferred to a proxy node component of the terminal; and a communication relation is set up to a home agent of the subscriber in accordance with the protocol of mobile IP.

In an embodiment, the communication relation to the home agent of the subscriber is set up via a foreign agent.

In an embodiment, the server agent is obtained with aid of the domain name system.

In an embodiment, the interrogated IP address is assigned to the terminal by the proxy node component.

In an embodiment, a local IP address is assigned to the terminal by the proxy node component.

This object is also inventively achieved in accordance with the present invention in a server agent in a home network of a mobile subscriber, said server agent comprising: a transmitter for returning an IP address which said server agent links to a subscriber identifier of said mobile subscriber given a request by an Internet access component of a foreign network by which the IP address for the mobile subscriber is requested from within the foreign network upon provision of the subscriber identity.

In an embodiment, the server agent further comprises: an address pool from which, upon receiving a request of an Internet access component of said foreign network, said server agent is further for making available an IP address from an address pool for said subscriber identifier that was given in said request and for transmitting said IP address to said Internet access component; and an association table in which said server agent stores said allocations between said subscriber identifier and IP address.

In an embodiment, the address pool comprises at least one of real IP addresses and virtual addresses for dynamic addressing.

This object is also inventively achieved in accordance with the present invention in an Internet access component comprising a request means for making a request for an IP address at a mobile subscriber's home agent for the mobile subscriber, which request is characterized by a subscriber identifier.

In further embodiments, in a protocol and a method for supporting mobility, an IP addressed is exchanged between an Internet access component and a server agent.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
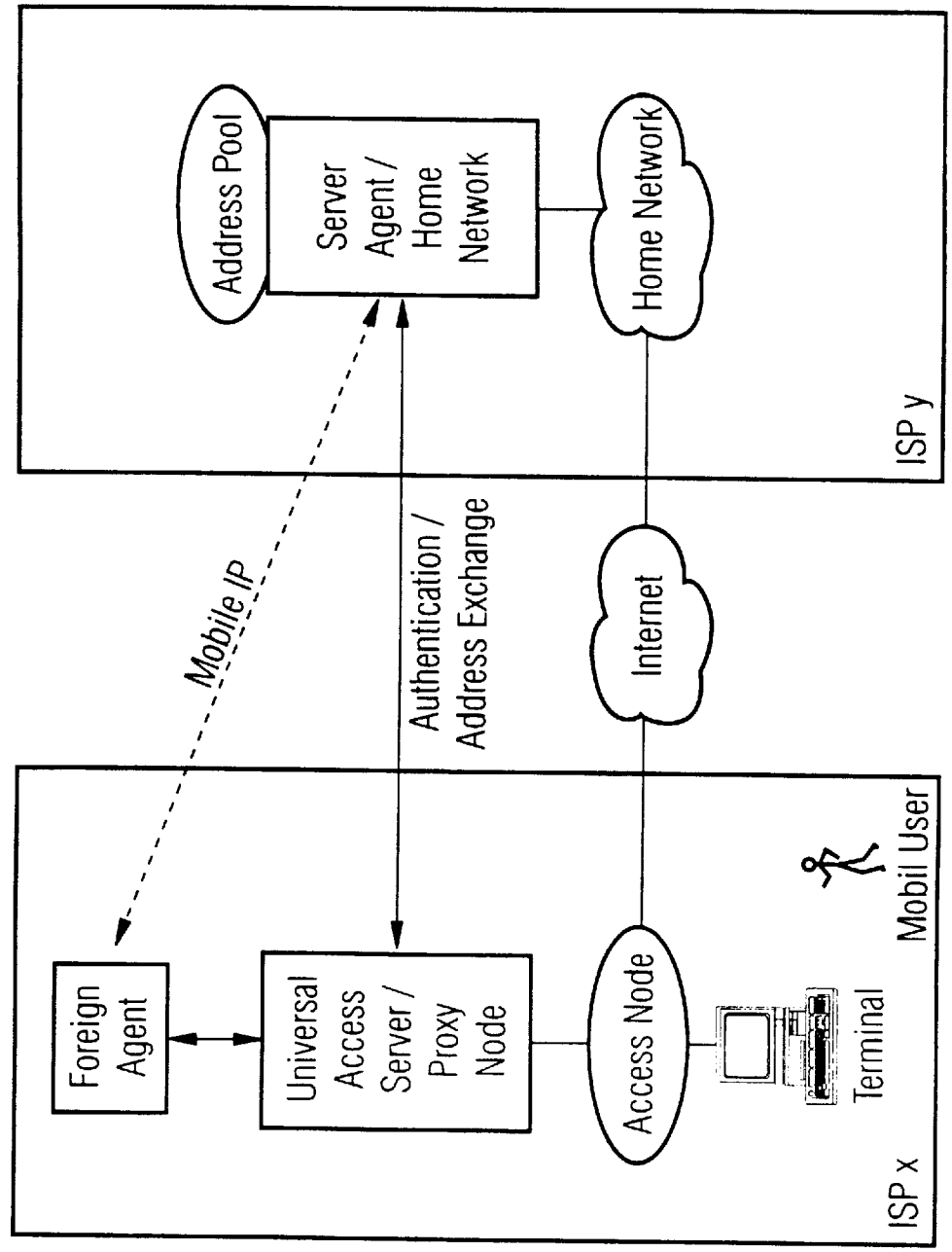
FIG. 1 is a block diagram illustrating a method for supporting mobility in the Internet in accordance with the present invention.

The following components are essential to the method for supporting personal mobility:

New Components and Functionalities

The mobile subscriber dials in via a terminal into an access node of a foreign network. The access node connects him to a network node (universal access server/proxy node, UAS/PN) that has the following functionality.

Authentication of the Subscriber:

An authentication takes place between UAS/PN and the server agent in the home network (SA). This could alternatively take place via an external authentication center (a dedicated server).

Interrogation of IP Address:

The server agent in the HN receives a request of the UAS/PN for an IP address for the terminal of the mobile subscriber, which request is characterized by a user identification (subscriber identity). The UAS/PN can obtain the SA (as IP address) that is responsible for the subscriber from part of the subscriber identification (in e-mail addresses, what is known as the domain name) via the domain name service DNS (usually a chain of name servers). Next, the SA is requested via a corresponding authentication and address interrogation protocol. In this request, the IP address of the UAS/PN is automatically loaded on the application level (it is present in each IP packet that is sent by the UAS/PN).

The authentication and address interrogation protocol can be outlined as follows: In a first step, the UAS/PN checks at the SA whether the subscriber exists (and possibly also has a corresponding password) and whether the network operator of the home network also takes over the billing for using the services of the UAS/PN (accounting). This must be confirmed by the SA. If not, the subscriber does not receive an access authorization. In a second step, the UAS/PN requests an IP address for the terminal of the subscriber. This must then be delivered by the SA. Error processing mechanisms, such as repetition of requests if a confirmation fails to occur, are given consideration here.

Functionality of the SA: Mapping Functionality

Upon receiving said request, the server agent releases an address from an existing address pool and transfers it to the UAS/PN. This address pool includes either existing IP addresses for real computers in the HN or a virtually existing address space for dynamic addressing. In the SA an association is produced between the identity of the subscriber and the IP address (mapping). This is a necessary precondition for the reachability of the subscriber under his identity via the terminal.

For said mapping functionality, the following means must be available:

a protocol for exchanging IP addresses between UAS/PN and SA an association table between IP addresses and identity.

These functionalities are necessary for the registration of the subscriber and the addressing of the terminal. They thus represent a preparation phase for the actual exchange of messages data. The following functionality of the UAS/PN is necessary for the exchange of message data:

Proxy Node (proxy mobile node)

This functionality represents the terminal to the Internet with the specific identity of the subscriber. The terminal has access to the UAS/PN via an access node.

The communication connection to the UAS/PN can be established via standard methods, such as point-to-point protocol PPP. To do this, an IP address is assigned to the terminal by the UAS/PN. This IP address is either the IP address received by the SA or an IP address that was newly defined by the UAS/PN locally. In the latter case, the UAS/PN must perform an IP address conversion (The PN component of the UAS/PN unpacks IP packets that were sent to the UAS/PN by the terminal and provides them with the IP address that was assigned by the SA as sender). The UAS/PN (i.e. the PN component) uses the known principle of mobile IP (see C. Perkins, "Mobile IP", IEEE Communication Magazine, May 1997, pp. 84–99)—therefor; to put the subscriber in the position to use all services of the Internet with his terminal, as if the terminal were connected to the HN. The principle of mobile IP is described briefly thus:

To realize mobile IP (terminal mobility), three components are typically used: mobile node (MN), home agent (HA) and potentially foreign agent (FA). The MN is a terminal that changes its connection point in a home network to a different connection point in a foreign network, while the IP address is maintained. When the MN is located in the foreign network, the HA in the home network forwards packets for the MN to the MN via a tunnel (represented by two endpoints, i.e. IP addresses) which ends at the FA. The FA makes routing services available to the MN: forwarding the packets coming from the HA as well as a router function for packets coming from the MN. With the aid of these components, terminal equipment mobility is provided in a transparent manner.

Furthermore, the functionality of the home agent is required for the present invention, which functionality is integrated into the SA.

What the present invention achieves is that the mobile subscriber can both send and receive messages in a foreign network under his HN identity. When the subscriber leaves the location he has temporarily occupied, this is reported to the SA. This can be done by taking a variety of measures; for example:

active removal from the association table of the SA given a change of location. This is prompted as soon as the subscriber logs off from the terminal.

time controlled deletion from the association table of the SA in case the subscriber does not demand any services for a longer period of time.

When the terminal itself is a host (network computer, network node), the PN component is omitted. The terminal, which is then also a mobile node in accordance with mobile IP, and the UAS can then be realized on a host with respect to their functionality in principle the UAS function can be a protected software process. But there may also be a separate server for the UAS. The terminal then requires a client function for communicating with the UAS.

A detailed description is now given of the application environment of the present invention and the interplay of the components for carrying out the invention.

The subscriber is usually located in the home network (HN). When the subscriber is mobile, he wants to communicate with other subscribers (e.g. voice over Internet), or generally to use Internet services, from another location via an arbitrary terminal with the ability to access the Internet. When the subscriber is located in a foreign network, usually a terminal or a connection is provided there (e.g. PC with dial-in capability). The subscriber now wishes to use his customary home services or explicitly to access resources in his HN from there. Beyond this, he wishes to be reached by other subscribers under his generally known identity. The subscriber thus acts as follows:

The mobile subscriber logs on via a terminal at an access node of a (foreign) Internet service provider (ISP x). He enters his user identification, for instance in the form of an e-mail address. The user identification is received by the UAS/PN. From this, the UAS/PN obtains (e.g. with the aid of the domain name service which is used in the Internet) the address of the server agent (SA) in the home network (ISP y). Via a specific authentication protocol, the mobile subscriber is identified by the SA. An IP address is then extracted from the address pool that is available to the SA. The SA registers the link "user identification—IP address" in an association table and transfers the IP address to the UAS/PN via a specific protocol. A specific user profile can be transferred in connection with this.

Now the UAS/PN assigns the IP address to the terminal and activates the proxy mobile node component. This logs on at the foreign agent (mobile IP). In accordance with the mechanisms of mobile IP, a communication path is established between the SA in the home network, the foreign agent, and the proxy mobile node. In this process, the proxy mobile node logs on at the foreign agent vicariously for the subscriber and gives it the address of the SA in the home network. Then the tunnel is established between the foreign agent and the home agent, and the source address given by the proxy mobile node is checked. If this process is successful (i.e. the above mentioned communication path is set up), a communication connection is set up between UAS/PN and terminal via the access node (for instance by the standard method of point-to-point protocol, PPP). When data packets from other communication subscribers now arrive at the proxy mobile node, they are routed directly to the terminal at which the subscriber is located. The mobile subscriber is thus now reachable worldwide from any Internet access. In applications such as Internet telephony, the mobile subscriber can be called at any time.

The terminal can also be temporarily converted into a work environment for the mobile subscriber (which is virtually equivalent to the services used in the home network). Suitable protocols for this are known from the field of local networks for X terminals. For these protocols, a destination IP address is sufficient to route the graphic output to another terminal. A selection of services (videotelephony, messaging services, etc.) like the usual home services is then available to the mobile subscriber.

When the mobile subscriber ends his activity, he logs off from the terminal. Typically the terminal is then released again, the temporary IP address is erased, and a message of the proxy mobile node is sent to the SA in the home network, so that the entry in the association table can be erased.

The present invention comprises the following attributes:

Mobile identity independent of Internet addresses, realized by the association table of the server agent in the home network and by the address exchange between universal access server/proxy node and server agent in the home network.

Mobile communication from a standard terminal via the Internet, realized by functionalities of the proxy mobile node.

Combination with the existing "mobile IP" method.

The present invention contains pure roaming as a subset; that is, an agreement between two network operators (ISPs) that, for instance, an Internet access is made available in a foreign network and that its usage can be charged.

Although modifications and changes may be suggested by those of ordinary skill in the art, it is the intention of the inventors to embody within the patent warrented hereon all changes and modifications as reasonably and properly come within the scope of their contribution to the art.

We claim:

1. A method for supporting mobility in the Internet, said method comprising the steps of:

providing a terminal that is not connected to a home network of a mobile subscriber;

inputting a subscriber identification for said mobile subscriber via said terminal;

providing service readiness of said terminal for said mobile subscriber by interrogating an IP address for said mobile subscriber at a server agent in said home network of said mobile subscriber by an Internet access component with the aid of said subscriber identification;

providing the server agent with an address pool of IP addresses;

providing the server agent with an association table which stores allocations between subscriber identifications and IP addresses;

associating by means of the address pool and the association table of the server agent an IP address with the subscriber identification of the mobile subscriber;

returning from the server agent to the terminal the IP address associated with the subscriber identification of the mobile subscribers;

transferring said interrogated IP address to a proxy node component of said terminal; and then setting up a communication relation to a home agent of said subscriber in accordance with the protocol of mobile IP.

2. The method as claimed in claim 1, wherein said communication relation to said home agent of said subscriber is set up via a foreign agent.

3. The method as claimed in claim 1, further comprising the step of:

obtaining said server agent with aid of the domain name system.

4. The method as claimed in claim 1, further comprising the step of:

assigning said interrogated IP address to said terminal by said proxy node component.

5. The method as claimed in claim 1, further comprising the step of:

assigning a local IP address to said terminal by said proxy node component.

6. A system for supporting mobility in the Internet, the system comprising:

a server agent in a home network of a mobile subscriber, the server agent including:
an address pool of IP addresses; and
an association table for storing allocations between subscriber identifications and IP addresses; and a terminal that is not connected to the home network, the terminal for providing access of the home network thereto by interrogating an IP address of the mobile subscriber at the server agent by means of an Internet access component including a subscriber identification, the subscriber identification for enabling the server agent to associate an IP address with the subscriber identification via the address pool and the association table, and for enabling the server agent to return the IP address to the terminal in order to provide access of the mobile subscriber thereto, the terminal further including a proxy node component to which said interrogated IP address is transferred; and a home agent of said subscriber to which is set up a communication relation in accordance with the protocol of mobile IP.

7. The system as claimed in claim 6, further comprising a foreign agent through which said communication relation to said home agent of said subscriber is set up.

8. The system as claimed in claim 6, wherein said server agent is obtained with aid of the domain name system.

9. The system as claimed in claim 6, wherein said proxy node component is configured to assign said interrogated IP address to said terminal.

10. The system as claimed in claim 6, wherein said proxy node component is configured to assign a local IP address to said terminal.

* * * * *